(12) United States Patent
Kozak et al.

(10) Patent No.: US 6,983,977 B1
(45) Date of Patent: Jan. 10, 2006

(54) CAB FAIRING AND PICKUP TRUCK HAVING A CAB FAIRING

(75) Inventors: W. Shawn Kozak, Decatur, GA (US); Steve Drabant, Snellville, GA (US); Keri Margaret Stoklas, Buford, GA (US); Rodney L. Bridges, Lilburn, GA (US); Robert A Iverson, Mound, MN (US)

(73) Assignee: Lund International, Inc., Anoka, MN (US)

( * ) Notice: Subject to any disclaimer, the term of this patent is extended or adjusted under 35 U.S.C. 154(b) by 0 days.

(21) Appl. No.: 10/976,171

(22) Filed: Oct. 28, 2004

(51) Int. Cl.
*B60J 1/00* (2006.01)

(52) U.S. Cl. .................... 296/108.1; 296/180.2
(58) Field of Classification Search ............ 296/180.1, 296/180.2; D12/181
See application file for complete search history.

(56) References Cited

U.S. PATENT DOCUMENTS

| 4,343,506 A | | 8/1982 | Saltzman |
| 4,408,792 A | | 10/1983 | Sullivan |
| D286,143 S | * | 10/1986 | Lund ..................... D12/181 |
| 4,640,541 A | | 2/1987 | FitzGerald et al. |
| 4,741,569 A | | 5/1988 | Sutphen |
| 4,915,441 A | | 4/1990 | Nitzke |
| 4,925,235 A | | 5/1990 | Fingerle |
| 4,931,809 A | | 6/1990 | Putman et al. |
| 4,932,716 A | | 6/1990 | Marlowe et al. |
| 4,957,322 A | | 9/1990 | Marlowe et al. |
| 4,991,906 A | | 2/1991 | Fingerle |
| 5,018,779 A | * | 5/1991 | Lund ..................... 296/180.1 |
| 5,054,799 A | | 10/1991 | Fingerle |
| 5,061,000 A | | 10/1991 | Haugen et al. |
| 5,258,893 A | | 11/1993 | Finneyfrock |
| 5,458,392 A | | 10/1995 | Chen et al. |

(Continued)

FOREIGN PATENT DOCUMENTS

EP 0413099 A1 6/1990

*Primary Examiner*—Joseph D. Pape
(74) *Attorney, Agent, or Firm*—Merchant & Gould P.C.

(57) ABSTRACT

A cab fairing is provided according to the present invention. The cab fairing includes a left rail, a right rail, a cross bar, a left side sail, and a right side sail. The left rail is provided for attachment to a left pickup truck bed sidewall, and the left rail includes a first slot for attachment to a left pickup truck sidewall and a second slot. The right rail is provided for attachment to a right pickup truck bed sidewall, and the right rail includes a first slot for attachment to a right pickup truck sidewall and a second slot. The cross bar has a left end and a right end, and is constructed for extension across at least a portion of a pickup truck cab. The left side sail has a first end and a second end. The left side sail first end is constructed for attachment to the second slot of the left rail, and the left side sail second end is constructed for attachment to the left end of the cross bar. The right side sail has a first end and a second end. The right side sail first end is constructed for attachment to the second slot of the right rail, and the right side sail second end is constructed for attachment to the right end of the cross bar. A pickup truck that includes the cab fairing is disclosed.

22 Claims, 4 Drawing Sheets

U.S. PATENT DOCUMENTS

| | | |
|---|---|---|
| 5,882,058 A | 3/1999 | Karrer |
| 5,947,520 A | 9/1999 | McHorse |
| 6,126,229 A * | 10/2000 | Lund ....................... 296/180.1 |
| 6,186,571 B1 | 2/2001 | Burke |
| 6,267,434 B1 | 7/2001 | Casillas |
| D490,356 S | 5/2004 | Ratajczek |

* cited by examiner

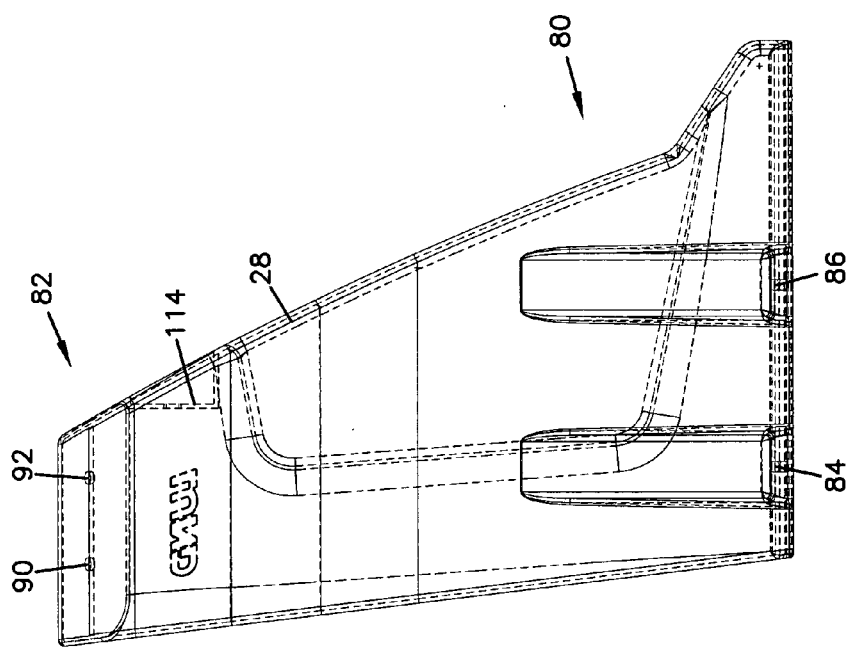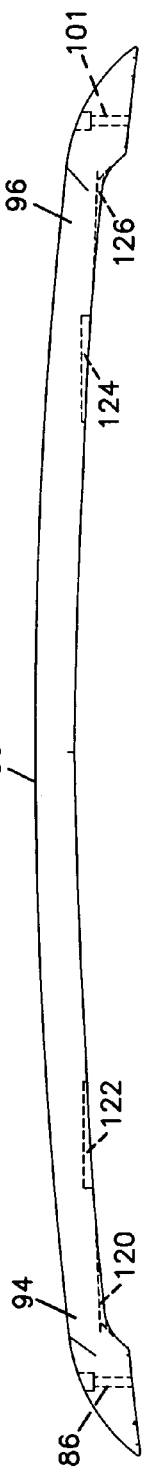

CAB FAIRING AND PICKUP TRUCK HAVING A CAB FAIRING

FIELD OF THE INVENTION

The invention relates to a cab fairing for use on a pickup truck and to a pickup truck having a cab fairing. In particular, the cab fairing attaches to the sidewalls of a pickup truck bed and includes side rails available to assist with cargo management within the pickup truck bed.

BACKGROUND OF THE INVENTION

Cab fairings are often provided either extending from the rear of a pickup truck cab or from the sidewalls of a pickup truck bed. In general, cab fairings are often provided for decreasing the drag effect of airflow over the cab and also for aesthetic appeal. Exemplary cab fairings are described in U.S. Pat. No. 6,126,229 to Lund, U.S. Pat. No. 5,018,779 to Lund, U.S. Design Pat. No. 281,487 to Chapman, U.S. Design Pat. No. 286,143 to Lund, U.S. Design Pat. No. 294,242 to O'Neill, and U.S. Design Pat. No. 295,084 to Weber.

Items placed within a pickup truck often have a tendency to move around or shift as the pickup truck is driven. There are techniques used to hold items in the bed of a pickup truck and prevent movement or shifting. Items are often tied down if there is something to which the item can be secured.

SUMMARY OF THE INVENTION

A cab fairing is provided according to the present invention. The cab fairing includes a left rail, a right rail, a cross bar, a left side sail, and a right side sail. The left rail is provided for attachment to a left pickup truck bed sidewall, and the left rail includes a first slot for attachment to a left pickup truck sidewall and a second slot. The right rail is provided for attachment to a right pickup truck bed sidewall, and the right rail includes a first slot for attachment to a right pickup truck sidewall and a second slot. The cross bar has a left end and a right end, and is constructed for extension across at least a portion of a pickup truck cab. The left side sail has a first end and a second end. The left side sail first end is constructed for attachment to the second slot of the left rail, and the left side sail second end is constructed for attachment to the left end of the cross bar. The right side sail has a first end and a second end. The right side sail first end is constructed for attachment to the second slot of the right rail, and the right side sail second end is constructed for attachment to the right end of the cross bar.

A pickup truck is provided according to the invention. The pickup truck includes a bed, a left sidewall, a right sidewall, and the cab fairing attached to the left sidewall and the right sidewall. The left rail of the cab fairing attaches to the left sidewall via the first slot and can attach at the stake pockets provided in the left sidewall. The right rail of the cab fairing attaches to the right sidewall via the first slot and can attach at the stake pockets provided in the right sidewall.

BRIEF DESCRIPTION OF THE DRAWINGS

FIG. 5 is a side view of the left side sail.

FIG. 6 is a rear view of the cross bar.

DETAILED DESCRIPTION OF THE INVENTION

Figure 1:
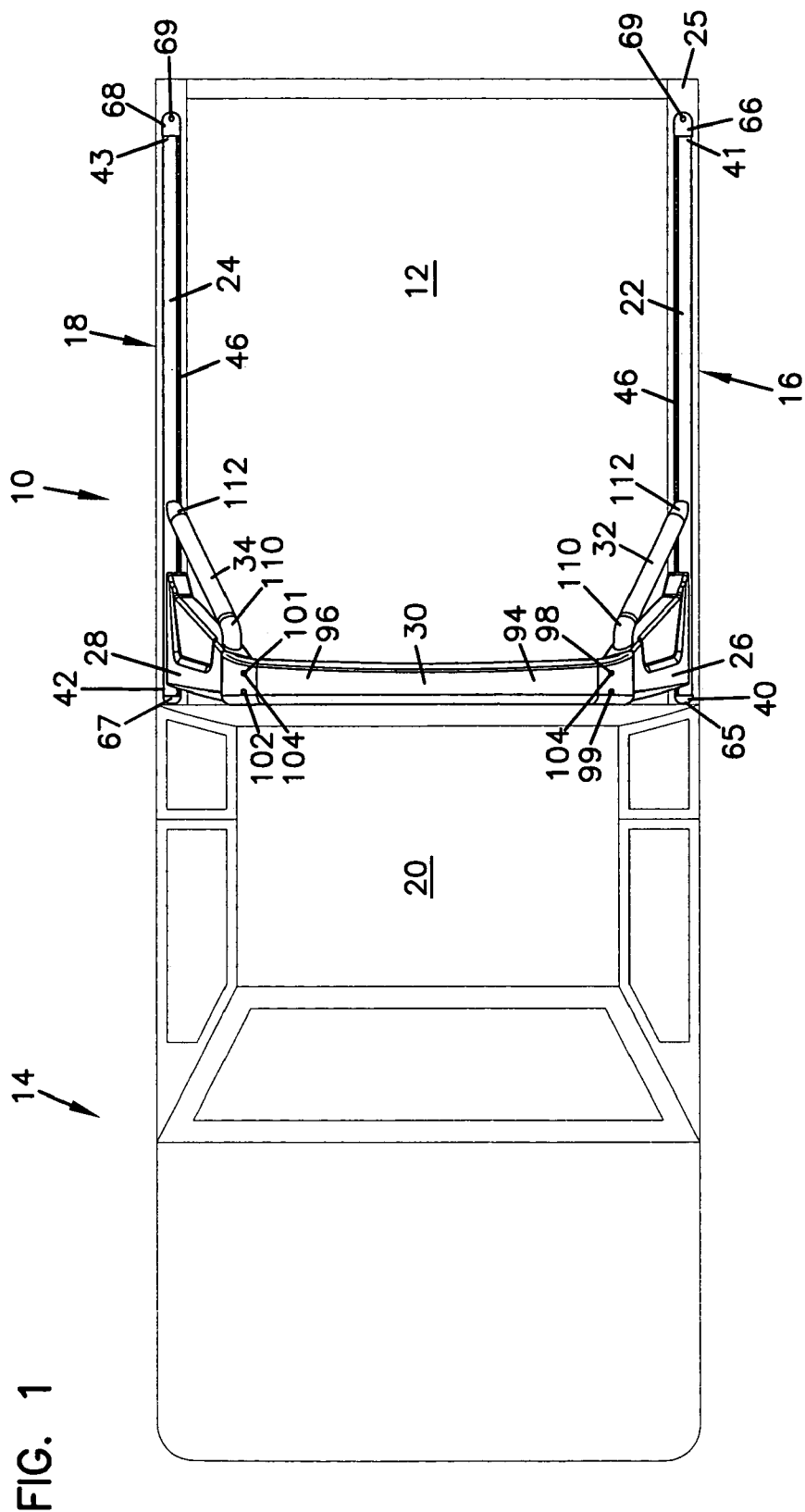
FIG. 1 is a top view of a cab fairing according to the principles of the present invention shown on a pickup truck.
Figure 2:
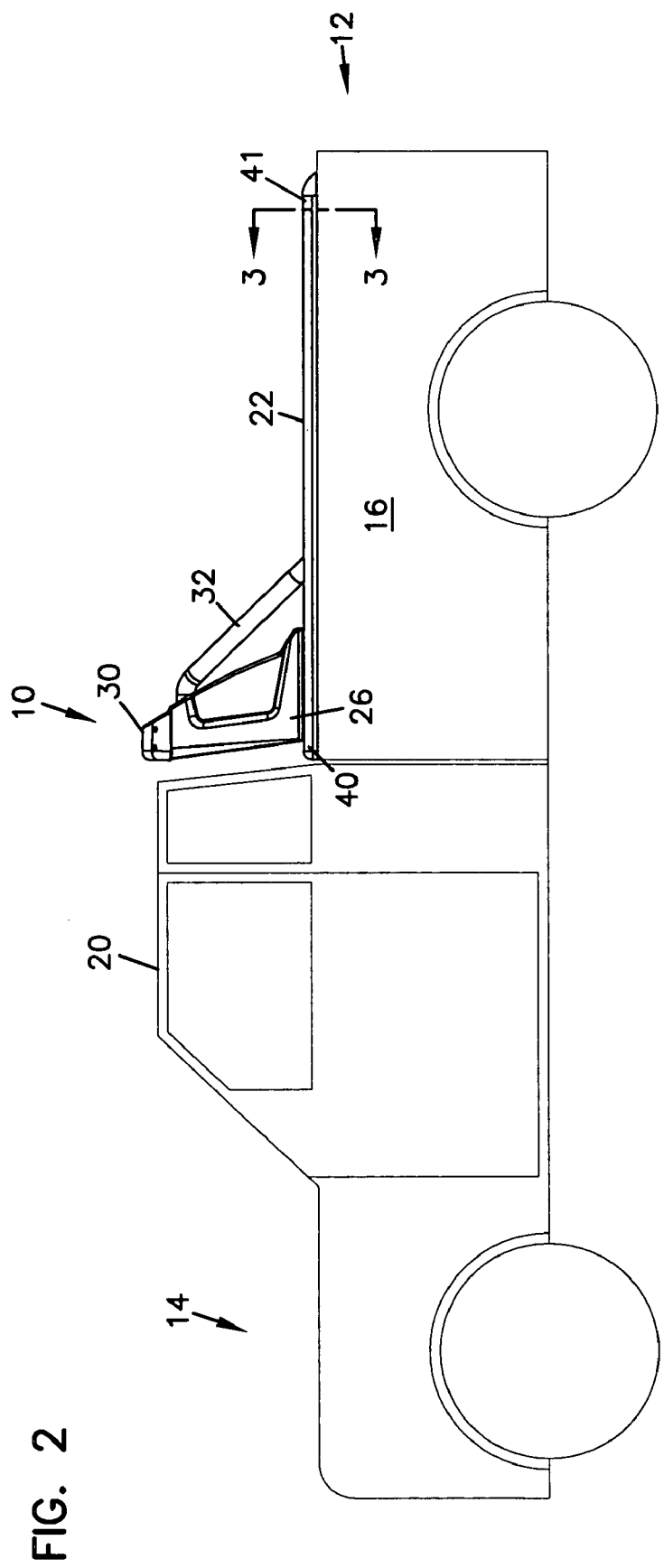
FIG. 2 is a side view of the cab fairing of FIG. 1 shown on a pickup truck.

Referring to FIGS. 1 and 2, a cab fairing according to the invention is shown at reference number 10. The cab fairing 10 is shown attached to the bed 12 of a pickup truck 14. The bed 12 includes a left sidewall 16 and a right sidewall 18. In general, the designations "left" and "right" as used herein refer to the orientation based upon a driver sitting within the cab 20.

The cab fairing 10 is shown having several components. The components include a left rail 22, a right rail 24, a left side sail 26, a right side sail 28, and a cross bar 30. Additionally included as optional components of the cab fairing 10 are the left fairing extension 32 and the right fairing extension 34. In general, it is expected that the left rail 22, the right rail 24, the left side sail 26, the right side sail 28, the cross bar 30, and the optional left fairing extension 32 and right fairing extension 34 will be available for attachment to the bed of a pickup truck using fasteners. In addition, the left rail 22 and the right rail 24 are available for cargo management within the pickup truck bed and can be used for attaching tie down materials thereto. Exemplary tie down materials include bungee cords, ropes, straps, and clamps.

The left rail 22 includes a forward rail end 40 and a rearward rail end 41. The right rail 24 includes a forward rail end 42 and a rearward rail end 43. The left rail 22 and the right rail 24 are provided so that they extend along the left side wall 16 and the right side wall 18 of the pickup truck 14. The left rail 22 and the right rail 24 can be provided so that they are adjacent to the top surface 25 of the left side rail and the right side rail. It should be understood that materials such as foam or padding can be provided between the left side rail 22 and the left sidewall 16, and between the right side rail 24 and the right sidewall 18.

The left rail 22 and the right rail 24 can attach to the left sidewall 16 and the right sidewall 18 at the stake pockets provided in the left sidewall 14 and the right sidewall 18. Now referring to FIG. 3, a cutaway view taken along lines 3—3 of FIG. 2 shows how the left rail 22 can attach to the left sidewall 16. The left rail 22 (and the right rail 24) can be provided as an extrusion containing a sidewall mount opening 44 and a fairing mount opening 46. The sidewall mount opening 44 can be referred to as the first slot, and the fairing mount opening 46 can be referred to as the second slot. In general, the rails can be provided as an extrusion, such as an aluminum extrusion, where the first slot and the second slot extend the length of the rail. By providing the rails as extrusions, they can be cut to fit a desired vehicle size. A fastener 48 can be provided for attaching the left rail 22 to the left sidewall 16 by extending through the sidewall mount opening 44 and the stake pocket 50. In general, the fastener 48 can include a bolt 52, a washer 54, a spring 56, a bracket 58, and a nut 60. The washer 54 allows the bolt 52 to sit within the sidewall mount opening 44 and compress the rail bottom 62 against the bed rail track 64 of the sidewall. By tightening the nut 60, the fastener 48 compresses the left rail 22 onto the left sidewall 16. Similar connections can be provided at the remaining stake pocket locations at, for example, the left forward rail end 40, the left rearward rail end 41, the right forward rail end 42, and the right rearward rail end 43.

Figure 3:
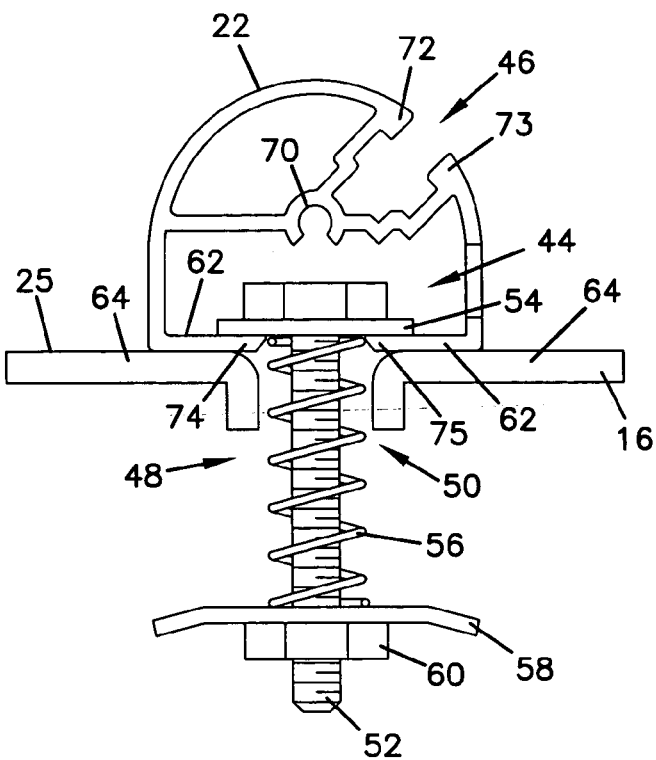
FIG. 3 is a cutaway view taken along lines 3—3 of FIG. 2 showing how the left rail attaches to the pickup truck left sidewall.

Now referring to FIGS. 1 and 3, end caps 65, 66, 67, and 68 can be provided on the rail ends 40, 41, 42, and 43 to provide a more finished appearance. In general, it is expected that a fastener 69, such as a screw, can extend through the cap and engage the rail at the fastener opening 70. The caps can be provided as molded plastic members. In addition, the caps can be snap fit into the rails or fit using an interference or friction fit. The general idea is for the caps to provide a finished appearance rather than exposing the ends of the extrusion that forms the rails.

The left rail 22 and the right rail 24 can be arranged on the left sidewall 16 and the right sidewall 18 so that the fairing mount opening 46 opens towards the bed 12. The fairing mount opening 46 allows for the left side sail 26, the right side sail 28, the left fairing extension 32, and the right fairing extension 34 to attach thereto. The fairing mount opening 46 can be referred to as a T-slot because it allows a fastener head to be received within the fairing mount opening 46 and become trapped by the shoulders 72 and 73. In addition, the sidewall mount opening 44 can be characterized as a T-slot by allowing a fastener head to become trapped therein as a result of the shoulders 74 and 75.

Figure 4:
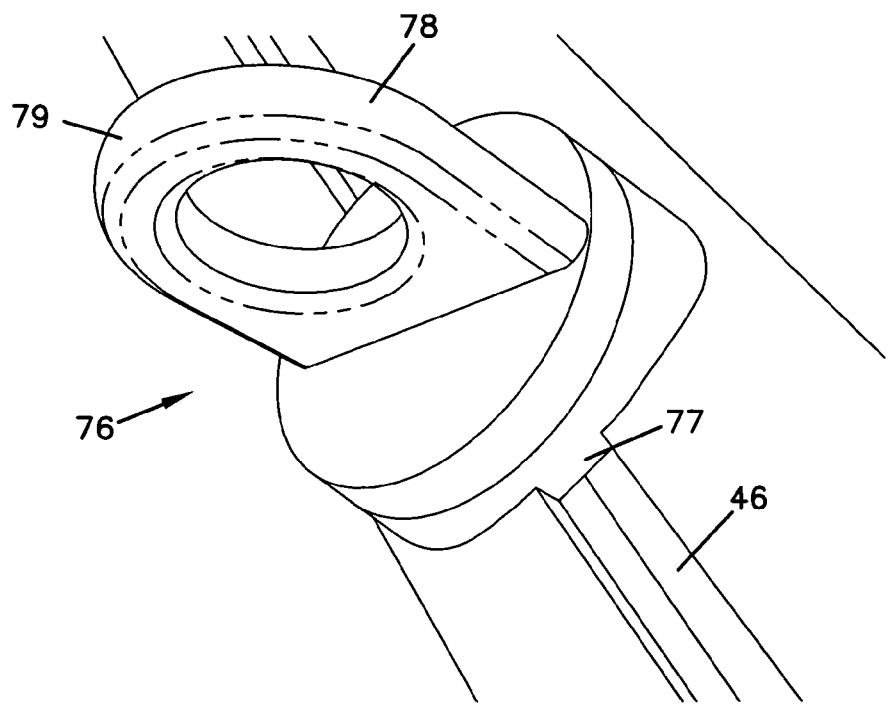
FIG. 4 is a perspective view of a tie down device for use with the cab fairing of FIG. 1.

As shown in FIG. 4, a tie down device 76 can be provided extending from the fairing mount opening 46. The tie down device 76 includes a slot fastening member 77 that fits within the fairing mount opening 46 so that it is held in place by the shoulders 72 and 73. The tie down device 76 additionally includes a tie down structure 78. The tie down structure 78 can be any structure that allows a tie down material to be fastened thereto. As shown, the tie down structure 78 includes a loop or ring 79. The tie down device 76 can move along the fairing mount opening 46 until it is provided at a desired location and then can be tightened in place. The rails can include multiple tie down devices to help deal with cargo management within the pickup truck bed 12.

The left side sail 26 and the right side sail 28 attach to the left rail 22 and the right rail 24, respectively, along the fairing mount opening 46. The left side sail 26, the right side sail 28, and the cross bar 30 can be formed from a polymeric material such as ABS polymer (acrylonitrile-butadiene-styrene). In addition, the left side sail 26, the right side sail 28, and the cross bar 30 can be manufactured using various molding techniques such as blow molding and/or rotational molding.

Now referring to FIG. 5, the right side sail 28 is shown. It should be understood that the left side sail 26 can be identical to the right side sail 28 except provided as a mirror image. The right side sail 28 includes a lower left side sail portion 80 and an upper left side sail portion 82. The lower left side sail portion 80 includes a first rail fastener opening 84 and a second rail fastener opening 86. In general, fasteners are provided through the first and second openings 84 and 86 so that the fasteners engage the fairing mount opening 46 provided in the right rail 24. The upper right side sail portion 82 includes a first cross bar opening 90 and a second cross bar opening 92. Now referring to FIGS. 1 and 6, the cross bar 30 includes a left cross bar end 94 and a right cross bar end 96. The left cross bar end 94 includes a first left cross bar opening 98 and a second left cross bar opening 99. The cross bar end 96 includes a first right cross bar opening 101 and a second right cross bar opening 102. Fasteners 104 can be provided extending through the openings to engage the corresponding openings in the left side sail 26 and the right side sail 28. By tightening the fasteners, the cab fairing can be held in place on the pickup truck 14.

The left fairing extension 32 and the right fairing extension 34 are optional components. That is, they can be included as part of the cab fairing 10 or omitted. The left fairing extension 32 and the right fairing extension 34 include side sail attachment ends 110 and rail attachment ends 112. As shown in FIG. 5, the right side sail 28 includes a fairing extension attachment location 114. The side sail attachment end 110 of the right fairing extension 34 attaches to the right side sail 28 at the fairing extension attachment location 114. Exemplary fasteners that can be used to hold the parts together include screws and/or nuts and bolts. The rail attachment end 112 of the right fairing extension 34 attaches to the right rail 24 at the sidewall mount opening 44. The fastener used to provide this attachment can be, for example, a bolt and nut arrangement having a head that fits within the sidewall mount opening 44. It should be understood that the left fairing extension 32 can be similarly attached to the left side sail 26 and the left rail 22.

Now referring to FIG. 6, the cross bar 30 can include contours 120, 122, 124, and 126 for attachment of lights thereto. That is, the cross bar can be provided with lights, if desired. The wiring for the lights can extend through the inner cavity of the cross bar 30 and one or both of the left side sail 26 and the right side sail 28. It should be understood that the lighting is optional.

As described previously, the side sails and the cross bar can be provided as molded plastic or polymer. Exemplary techniques for molding include blow molding and rotational molding. By utilizing these techniques, the pieces can be formed having an internal cavity. To assist with the connection of the various fasteners, inserts can be provided to help hold the pieces together.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A cab fairing comprising:
   (a) a left rail for attachment to a left pickup truck bed sidewall, wherein the left rail includes a first slot for attachment to a left pickup truck sidewall and a second slot;
   (b) a right rail for attachment to a right pickup truck bed sidewall, wherein the right rail includes a first slot for attachment to a right pickup truck sidewall and a second slot;
   (c) a cross bar having a left end and a right end, and wherein the cross bar is constructed for extension across at least a portion of a pickup truck cab;
   (d) a left side sail having a first end and a second end, the left side sail first end constructed for attachment to the second slot of the left rail and the left side sail second end constructed for attachment to the left end of the cross bar; and
   (e) a right side sail having a first end and a second end, the right side sail first end constructed for attachment to the second slot of the right rail and the right side sail second end constructed for attachment to the right end of the cross bar.

2. A cab fairing according to claim 1, further comprising: a left fairing extension having a first end and a second end, the left fairing extension first end is constructed for attachment to the second slot of the left rail and the left fairing extension second end is constructed for attachment to the left side sail.

3. A cab fairing according to claim 1, further comprising:
a right fairing extension having a first end and a second end, the right fairing extension first end is constructed for attachment to the second slot of the right rail and the right fairing extension second end is constructed for attachment to the right side sail.

4. A cab fairing according to claim 1, further comprising a tie down device constructed for attachment to the second slot of the left rail.

5. A cab fairing according to claim 1, wherein the left rail is constructed to lie against the left pickup truck sidewall along the entire length of the left rail.

6. A cab fairing according to claim 1, wherein the right rail is constructed to lie against the right pickup truck sidewall along the entire length of the right rail.

7. A cab fairing according to claim 1, wherein the left rail and the right rail comprise extruded aluminum.

8. A cab fairing according to claim 1, wherein the left rail and the right rail have a first end and a second end, and end caps attached to the first end and the second end.

9. A cab fairing according to claim 1, wherein the cross bar comprises a polymeric material formed as a result of blow molding.

10. A cab fairing according to claim 1, wherein the left side sail comprises a polymeric material formed as a result of blow molding.

11. A cab fairing according to claim 1, wherein the right side sail comprises a polymeric material formed as a result of blow molding.

12. A pickup truck comprising a bed, a left sidewall, a right sidewall, and a cab fairing attached to the left sidewall and the right sidewall, the cab fairing comprising:
  (a) a left rail attached to the left pickup truck bed sidewall, wherein the left rail includes a first slot for attachment to a left pickup truck sidewall and a second slot;
  (b) a right rail attached to the right pickup truck bed sidewall, wherein the right rail includes a first slot for attachment to a right pickup truck sidewall and a second slot;
  (c) a cross bar having a left end and a right end, and wherein the cross bar is constructed for extension across at least a portion of the pickup truck cab;
  (d) a left side sail having a first end and a second end, the left side sail first end attached to the second slot of the left side rail and the left side sail second end attached to the left end of the cross bar; and
  (e) a right side sail having a first end and a second end, the right side sail first end attached to the second slot of the right side rail and the right side sail second end attached to the right end of the cross bar.

13. A pickup truck according to claim 12, further comprising:
a left fairing extension having a first end and a second end, the left fairing extension first end is attached to the second slot of the left rail and the left fairing extension second end is attached to the left side sail.

14. A pickup truck according to claim 12, further comprising:
a right fairing extension having a first end and a second end, the right fairing extension first end is attached to the second slot of the right rail and the right fairing extension second end is attached to the right side sail.

15. A pickup truck according to claim 12, further comprising a tie down device attached to the second slot of the left rail or the right rail.

16. A pickup truck according to claim 12, wherein the left rail lies against the left pickup truck sidewall along the entire length of the left rail.

17. A pickup truck according to claim 12, wherein the right rail lies against the right pickup truck sidewall along the entire length of the right rail.

18. A pickup truck according to claim 12, wherein the left rail and the right rail comprise extruded aluminum.

19. A pickup truck according to claim 12, wherein the left rail and the right rail have a first end and a second end, and end caps attached to the first end and the second end.

20. A pickup truck according to claim 12, wherein the cross bar comprises a polymeric material formed as a result of blow molding.

21. A pickup truck according to claim 12, wherein the left side sail comprises a polymeric material formed as a result of blow molding.

22. A pickup truck according to claim 12, wherein the right side sail comprises a polymeric material formed as a result of blow molding.

* * * * *